United States Patent Office 3,359,158
Patented Dec. 19, 1967

3,359,158
IMIDAZOLE PYRAZOLE AND OXAZOLE INSECTI-
CIDES FOR FIBER EATING INSECTS
Roy J. Pence, Los Angeles, Calif., assignor to The Regents
of the University of California, Berkeley, Calif.
No Drawing. Filed Mar. 20, 1962, Ser. No. 181,169
10 Claims. (Cl. 167—37)

In general, the present invention relates to methods, compositions and the products resulting therefrom involved in the killing of insect pests and protection of said products from insect pests. More particularly, the methods, composition and products of the present invention can be used to repel and/or destroy many species of insect pests.

As is well known, man is constantly engaged in a struggle to protect himself and his possessions from infestation and attack by the multitudinous species of insect pests. For example, when man stores his grain products, they are subject to attack by insect pests such as the sawtoothed grain beetle, meal worms and the Indian meal moth. When man grows either ornamental plants or plants for food purposes, they are subject to attack by insect pests such as aphids, mealy bugs, thrips, whiteflies, armorscaled insects and soft-scaled insects. Structures that man builds are subject to attack by insect pests such as termites. Man's clothing and fabric articles such as carpets, upholstery, curtains and tapestries are subject to attack by insect pests such as the tapestry moth, the webbing clothes moth, the case-making moth and dermestids such as the black carpet beetle, the furniture carpet beetle, the varied carpet beetle and the common carpet beetle. Finally, man must contend against such common insect pests as ants and the common household fly.

Much time, money and effort have been expended in attempting to combat these various insect pests. For example, much effort has been extended to minimize or prevent the destruction of fibers by the fiber-eating insects but the results to date have not been too satisfactory. In the case of the fiber-eating insects, a commonly used method for protecting clothing is the use of solid, volatile moth repellents such as naphthalene or paradichlorobenzene. However, such techniques for protecting fibers necessarily involves storage in tightly-enclosed containers such as cedar chests, so that it cannot be used on articles in use or on large articles such as carpets, upholstery and furniture. In addition, in order to be reasonably effective, the stored articles must be saturated with the vapors of agents such as naphthalene and consequently, such articles retain an unpleasant odor for a substantial period of time after storage, even when thoroughly aired out.

The problem of the fiber-eating insects, however, is merely one part of the over-all problem of controlling the many insect pests. In the past, there have been relatively few insecticides which can be used against insects in general. An example of one of such relatively few insecticides is D.D.T., i.e., 1, 1, 1-trichloro-2,2-bis(p-chlorophenyl)ethane. However, such general purpose insecticides usually have specific deficiency when applied to particular insect pests. For example, when D.D.T. is used to protect against fiber-eating insects, there has been the problem of staining of the fibrous articles to be protected.

More important, the general purpose insecticides normally have relatively high toxicity with respect to humans and animals and this has substantially hampered their effectiveness. For example, the chlorinated insecticides, such as D.D.T., may be cutaneously absorbed by persons coming in contact with them for prolonged periods. Consequently, their use must be strictly controlled. It is very inadvisable to keep such chemicals around the house where children might have access to them. Even with careful control, children might put the treated articles in their mouths. In addition, as is well known, many insects have developed resistance to these general purpose insecticides. For example, it is well known that D.D.T. has become less and less effective because the various species of insects have developed resistance due to its constant use over long periods of time.

The present invention involves methods and compositions which may be applied to articles to be treated in any convenient manner such as dipping, spraying or dusting, to repel or kill insects. After application, the treated products continue to repel and kill insects over prolonged time periods without requiring treatment. Furthermore, the compositions and methods of the present invention may be applied directly to the insects to achieve a rapid killing of the particular insect pests being treated. An example of one specific application of the composition and methods of the present invention is where a piece of carpeting was treated and then located where it was subjected to being walked on very frequently in a laboratory. After a full year of such use, the piece was tested and found to be substantially as resistant to fiber-eating insect pests as it was at the start of the test period.

The novel compositions utilized in the present invention normally are odorless and will not stain or damage the products to be treated. Most important, the compositions utilized in the present invention are non-toxic to humans and animals. Furthermore, particularly with respect to fiber-eating insects, because of their unusual mode of operation, moths and carpet beetles have not been found to be able to develop a resistance to them. Finally, these advantages of the present invention have been found on the basis of comparative tests to be much more effective than most presently used insect repellents and insecticides.

In general, the objects of the present invention are methods, compositions and products produced thereby which repel and kill insects in general and fiber-eating insects in particular but which are not toxic to humans and animals.

Other objects of the present invention are simple, effective methods of treating articles made of fibers to render them unpalatable to fiber-eating insects even in the presence of normal contamination and spillage.

Other objects of the present invention are compositions which are unusually effective even in an extremely low concentration in protecting treated products from infestation and attack by insects, particularly fibers and articles made therefrom.

Still other objects of the present invention are products which repel and kill fiber-eating insects over prolonged periods of time without re-treating.

Still another object of the present invention is a rapid method of killing insects without deleterious effects on vegetation or other products which are contaminated by the treatment.

Other objects and advantages of the present invention will become readily apparent from the following description which illustrates exemplary embodiments of the present invention and which enables persons skilled in the art to know how to practice the invention.

Generally, the present invention involves methods, compositions and products adapted to rapidly kill many species of insects and protect products by utilizing an effective amount of a composition comprising an organic compound from a class consisting of a 5-member ring including three carbon atoms with the remaining atoms from the class consisting of nitrogen and oxygen. Of such class of compounds, the compound imidazole has been found to be unusually and exceptionally effective. In addition, the present invention involves the use of at least one member of the class consisting of boric acid formaldehyde and phenol in the compositions to produce a synergistic effect against particular species of insects.

As set forth above, the organic compounds used in the composition of the present invention are from a class consisting of a 5-member ring including three carbon atoms with remaining atoms from the class consisting of nitrogen and oxygen. Representative members of such class are imidazole, pyrazol, and oxazol. However, of the members of this class it has been found that imidazole is exceptionally effective. In the compositions used in the present invention, the organic compound may range from about 0.1% to 5% by weight of the composition. However, preferably the concentration of the organic compound should range from about 0.5% to 2% by weight of the composition.

In addition to the use of the aforementioned organic compound in the compositions of the present invention, the boric acid has been found effective particularly against the various species of fiber-eating insects. In such compositions, the boric acid may constitute about 0.2% to 10% of the weight of the composition but preferably it should constitute about 0.5% to 5% by weight of the composition. The improvement of the effectiveness of the composition containing boric acid appears to result from a synergistic effect since the effectiveness of the combination of the aforementioned organic compound and the boric acid is substantially greater than when either component is used separately, at the same concentration. For example, see Table I below.

TABLE I [1].—EFFECT OF IMIDAZOLE AND BORIC ACID ON BLACK CARPET BEETLE LARVAE

| Concentration (percent) | Larvae Mortality (No.) | Visual Damage | Excrement Wt. (mg.) | Remarks |
| --- | --- | --- | --- | --- |
| (1) 1% Boric Acid | 0 | Evident. | 4 | Few Black Pellets. |
| (2) 1% Imidazole | 0 | None | 3 | |
| (3) 0.5% Boric Acid, 0.5% Imidazole. | 3 | Very Slight. | 2 | Do. |
| Control | 0 | Evident. | 17 | |

[1] The background test information is set forth below in Example I.

In addition to the use in the group of organic compounds illustrated by imidazole and the use of boric acid, the use of formaldehyde and/or phenol in the composition of the present invention has been found effective particularly in rapidly killing a wide variety of insects. In the compositions of the present invention, formaldehyde or phenol may constitute about 0.1% to 2% of the weight but preferably they constitute about 0.5% to 1% of the weight.

The improvement of the effectiveness of the composition containing formaldehyde is shown below in Table II.

TABLE II.—CONTACT EFFECT OF IMIDAZOLE AND FORMALDEHYDE ON GERMAN COCKROACHES [1]

| Composition | Time for Complete Mortality (min.) | |
| --- | --- | --- |
| | Half-Grown | Full Grown |
| (1) 0.25 gm. imidazole, 25 ml. isopropyl alcohol, 25 ml. Base Oil "C",[2] 10 drops Protyl 7105.[3] | 7-8 | Over 30. |
| (2) 0.5 ml. (37%) formaldehyde, 25 ml. isopropyl alcohol, 25 ml. Base Oil "C",[2] 10 drops Protyl 7105.[3] | 6-7 | Do.[4] |
| (3) 0.25 gm. imidazole, 0.5 ml. (37%) formaldehyde, 25 ml. isopropyl alcohol, 25 ml. Base Oil "C",[2] 10 drops Protyl 7105.[3] | 1.5 | 10. |
| (4) 25 ml. isoproyl alcohol, 25 ml. Base Oil "C",[2] 10 drops Protyl 7105.[3] | 7-8 | Over 30.[4] |

[1] Each German cockroach was sprayed once with the composition being tested and then the tested composition was permitted to evaporate while the behavior of the cockroach was observed.
[2] Deodorized kerosene produced by The Shell Oil Co., Los Angeles, California.
[3] Polyethoxylated alkyl ethanol nonionic surfactant produced by the Process Chemicals Co., Santa Fe Springs, California.
[4] Little or no mortality produced by single spraying. Additional spraying required to achieve complete mortality.

The composition of the present invention may be applied to the insects to be killed or to the products to be protected, in the form of aerosols, solutions, emulsions, pastes or creams. Compositions such as solutions may utilize either a water solvent or common organic solvents such as methanol, ethanol or kerosene. Preferably, for treating fibrous materials such as carpets and rugs in a house, a solution of the composition in a solvent comprising equal parts of deodorized kerosene (Shell Base Oil "C") and isopropyl alcohol is used to facilitate evaporation and penetration of the solution. Such solvent is inexpensive, safe (high flash-point) and relatively inoffensive (less odor). In addition, surfactants such as the nonionic polyethoxylated alkyl ethanol (Process Chemicals Co.'s Protyl 7105) and oleic acid are preferably used to increase the penetration of the solution and the compatibility of the ingredients such as imidazole and boric acid with the organic solvents. When fibers or articles produced therefrom are desired to be protected from fiber eating insects, the concentration of composition carried by the fibers or articles ranges from about 0.5% to 10% by weight and, preferably, from about 1% to 5% by weight. For example, the wool test fabric when soaked in a 1% aqueous solution of imidazole for 30 minutes at 100° F. will absorb 1.9% of its weight of imidazole.

It should be noted that the composition of the present invention when deposited on fibrous articles not only repels and kills fiber eating insects over prolonged periods of time without retreating, but also maintains such effectiveness after numerous cleanings of the fibrous article. For example, as set forth below in Table III, treated test pieces of wool fabric were dry-cleaned up to 8 times in commercial dry-cleaning solvent and the effectiveness of the composition was found to be substantially unchanged. In Table III, each test piece (except for the control piece) of wool fabric (2 in. square) was first dipped into and thoroughly saturated with the solution being tested and then dried. Each dry-cleaning of each test piece involved immersion in a tank of carbon dichloride (perchloroethylene) with constant agitation for a period of 10 minutes. After each dry-cleaning, each test piece was drip-dried. Each test piece was then tested following the procedure set forth in Example I.

TABLE III.—EFFECT OF DRY-CLEANING ON EFFECTIVENESS OF COMPOSITION

| Test Solution Used (aqueous) | Number of Dry-Cleanings | Visual Damage | Excrement Weight (mg.)[1] | Remarks |
|---|---|---|---|---|
| 0.25% imidazole, 1% boric acid | 2 | Very Slight | 3 | [2] |
| Do | 4 | Slight | 3.5 | [2] |
| Do | 8 | Very Slight | 3 | [2] |
| 0.5% imidazole, 1% boric acid | 2 | do | 3 | [2] |
| Do | 4 | None | 2 | [2] |
| Do | 8 | do | 2 | [2] |
| Untreated Control | 2 | Evident | 16 | |

[1] See discussion concerning excrement weight in Example I.
[2] At the end of the test period, all test larvae were obviously emaciated and death was imminent.

In addition, it should be noted that the effectiveness of the composition of the present invention may be enhanced by increasing its acidity to a pH in the range of about 3 to 6. Such increase in acidity may be obtained by the addition of HCl, $H_2SO_4$ or any other strong acid sufficiently strong to achieve the desired pH without causing substantial dilution of the solution. The results of increasing the acidity are illustrated in Table IV below, using, in general, the test procedure set forth in Example I below. The increased acidity was obtained by the addition of hydrochloric acid.

TABLE IV.—EFFECT OF INCREASING ACIDITY OF COMPOSITION

| Test Solution (aqueous) | Larvae Mortality (No.) | Visual Damage | Excrement Weight (mg.) |
|---|---|---|---|
| (1) 1% imidazole | 0 | None | 3. |
| (2) 1% imidazole at pH 5 | 6 | do | Less than 1. |
| (3) Untreated Control | 0 | Evident | At least 15. |

The following examples illustrate and exemplify the effects obtained by this invention. In general, the tests with respect to the protection of fabrics and the killing of fiber eating insects, were conducted in accordance with the specifications of the Chemical Specialties Manufacturers Association (CSMA). See Soap and Chemical Specialties, May, 1959.

*Example I*

A wool test fabric was cut into 2 in. square pieces. Each piece was dipped into and thoroughly saturated with the solution being tested, except for the control piece, and then dried and placed into a plastic container. The solutions used in this test were all aqueous solutions. Ten (10) black carpet beetle larvae (retained by a 20-mesh screen) were then placed in the containers. After a period of 17 days, the pieces were observed for damage, the beetles were observed for mortality and the excrement was weighed and observed for the presence of black fecal pellets. Excrement weight indicates most accurately the amount of feeding since visual damage may occur without feeding. Presence of black pellets indicates that the larvae existed by feeding on their cast skins rather than on the fabric sample.

| Imidazole Concentration (Percent) | Larvae Mortality (No.) | Visual Damage | Excrement Weight (mg.) | Remarks |
|---|---|---|---|---|
| (1) 1.25 | 0 | None | 3 | Approx. 50% black pellets. |
| (2) 5 | 1 | do | 2.5 | Approx. 90% black pellets. |
| Control | 0 | Evident | 16 | Approx. 10% black pellets. |

*Example II*

Test conditions were the same as Example I except furniture carpet beetle larvae 6 weeks old were used.

| Imidazole Concentration (Percent) | Larvae Mortality (No.) | Visual Damage | Excrement Weight (mg.) | Remarks |
|---|---|---|---|---|
| (1) 1.25 | 9 | None | Less than 1 | |
| (2) 5 | 10 | do | do | |
| Control | 0 | Evident | 6 | |

*Example III*

Groups of the following list of insects were sprayed with a 1% solution of imidazole in spray oil [1] or kerosene. Substantially all members of each group were quickly killed [2]. For example in the case of cockroaches; death occurred within 30 seconds. Also, in the case of cockroaches, many were killed merely by walking over a surface sprayed many hours before.

Cockroaches  
Dry wood termites  
Furniture carpet beetles  
Webbing clothes moths  
Tapestry moths  
Sawtoothed grain beetles  
Mealworms  
Indian meal moths  
Argentine ants  
Honeybees  
Aphids  
Mealybugs  
Thrips  
Armored scale insects  
Soft scale insects  
Whiteflies  
Houseflies

[1] Standard Oil Volck Supreme Agricultural Spray Oil, i.e., an unsulfonated petroleum distillate.
[2] Mosquito larvae were also killed by imidazole in concentrations of 1 part per million in water.

One of the important features of the present invention is that it provides a method and composition for protecting fibers and articles made therefrom, such as clothing, carpets, upholstery, curtains and tapestries. Not only do the methods and compositions of the present invention kill fiber eating insects such as the black carpet beetle, but also they may be utilized in much smaller concentrations to protect the fibrous article from attack and destruction by such fiber eating insects. It has been found that solutions containing as low as 0.1% of imidazole are successful in preventing attack on the fibrous articles since insect pests such as carpet beetles and moths will seek other sources of food supply. The fact that the compositions and method of the present invention have been successful in combating the black carpet beetle in particular represents an outstanding advantage since this particular insect pest has been found to be one of the most difficult insect pests to combat in the household. It should be noted that the composition of the present invention is stable, has good substantivity and generally is compatible with most fibers and does not have deleterious effects with respect to fiber tensile strength, staining, hand, odor and cleanability.

Another outstanding feature of the present invention is its wide applicability to many species of insects to quickly kill such insects. Among the various species of insects which have been found to be quickly killed by even very low concentrations of the compositions of the present invention are cockroaches, termites, fabric insects, grain beetles, meal worms, meal moths, ants, bees, aphids, mealy bugs, thrips, scale insects and flies. It has been found by merely contacting such insects with a 1% solution of imidazole that they can be killed in as little as 30 seconds.

Still another important feature of the present invention is the fact that the methods and compositions of the present invention have been found to be non-toxic to humans, animals and vegetation which have been exposed to them. Thus, the present invention affords an unusual means of controlling many species of insects and fiber-eating insects in particular, over long periods of time without danger to children and to household pets.

It will be understood that the foregoing description and examples are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

I claim:

1. A method for protecting fibers and articles made therefrom from destruction by fiber-eating insects which comprises: depositing on said fibers and articles a composition comprising an effective amount of an organic compound from a class consisting of imidazole, pyrazol and oxazol.

2. A method as stated in claim 1 wherein said composition contains 0.2% to 10% by weight of boric acid and said organic compound is imidazole.

3. Fibers and articles made therefrom carrying an effective amount of an organic compound from the class consisting of imidazole, pyrazol and oxazol, adapted to protect said fibers and articles from infestation and attack by fiber-eating insects.

4. Fibers and articles made therefrom carrying an effective amount of imidazole adapted to protect said fibers and articles from infestation and attack by fiber-eating insects.

5. A method for protecting fibers and articles made therefrom from destruction by fiber-eating insects which comprises depositing on said fibers and articles an effective amount of a composition adapted to protect said fibers and articles from said insects, comprising boric acid and an organic compound from the class consisting of imidazole, pyrazol and oxazol.

6. A method as stated in claim 5 wherein said organic compound is imidazole.

7. An effective protective composition adapted to be applied to fibers, textiles, fabrics and articles made therefrom for immunizing said fiber materials from infestation and attack by fiber-eating insects, comprising a solution of from about 0.1% to 5% by weight of imidazole and about 0.2% to 10% by weight of boric acid.

8. Fibers and articles made therefrom carrying an effective amount of a composition adapted to protect said fibers and articles from infestation and attack by fiber-eating insects, said composition comprising boric acid and an organic compound from the class consisting of imidazole, pyrazol and oxazol.

9. Fibers and articles made therefrom carrying an effective amount of a composition adapted to protect said fibers and articles from infestation and attack by fiber-eating insects, said composition comprising imidazole and boric acid.

10. An effective protective composition adapted for application to fabrics, textiles, fibers and articles made therefrom to immunize the same from attack by fibrous eating insects and for application upon vegetation to eliminate insect infestation without deleterious effects on vegetation or deposition of residues toxic to man comprising a solution of from about 0.1% to 5% by weight of imidazole and from about 0.5% to 5% of boric acid.

References Cited

UNITED STATES PATENTS 2,953,492  9/1960  Duggins _____ 167—33

OTHER REFERENCES

Frear: A Catalogue of Insecticides and Fungicides, vol. I, 1947, pp. 99, 126, 177.

Wellman: Contributions from Boyce Thompson Institute, vol. 14, Jan.-March 1946, p. 151.

King: U.S. Dept. Agriculture Handbook No. 69, May 1954, p. 196.

ALBERT T. MEYERS, *Primary Examiner.*

JULIAN S. LEVITT, *Examiner.*

J. D. GOLDBERG, *Assistant Examiner.*